April 20, 1954  E. S. PURINGTON  2,676,317
PULSE ECHO RADAR SYSTEM EMPLOYING A DOUBLE CHANNEL
Filed Jan. 12, 1945  3 Sheets-Sheet 2

INVENTOR
ELLISON S. PURINGTON.
BY
ATTORNEY

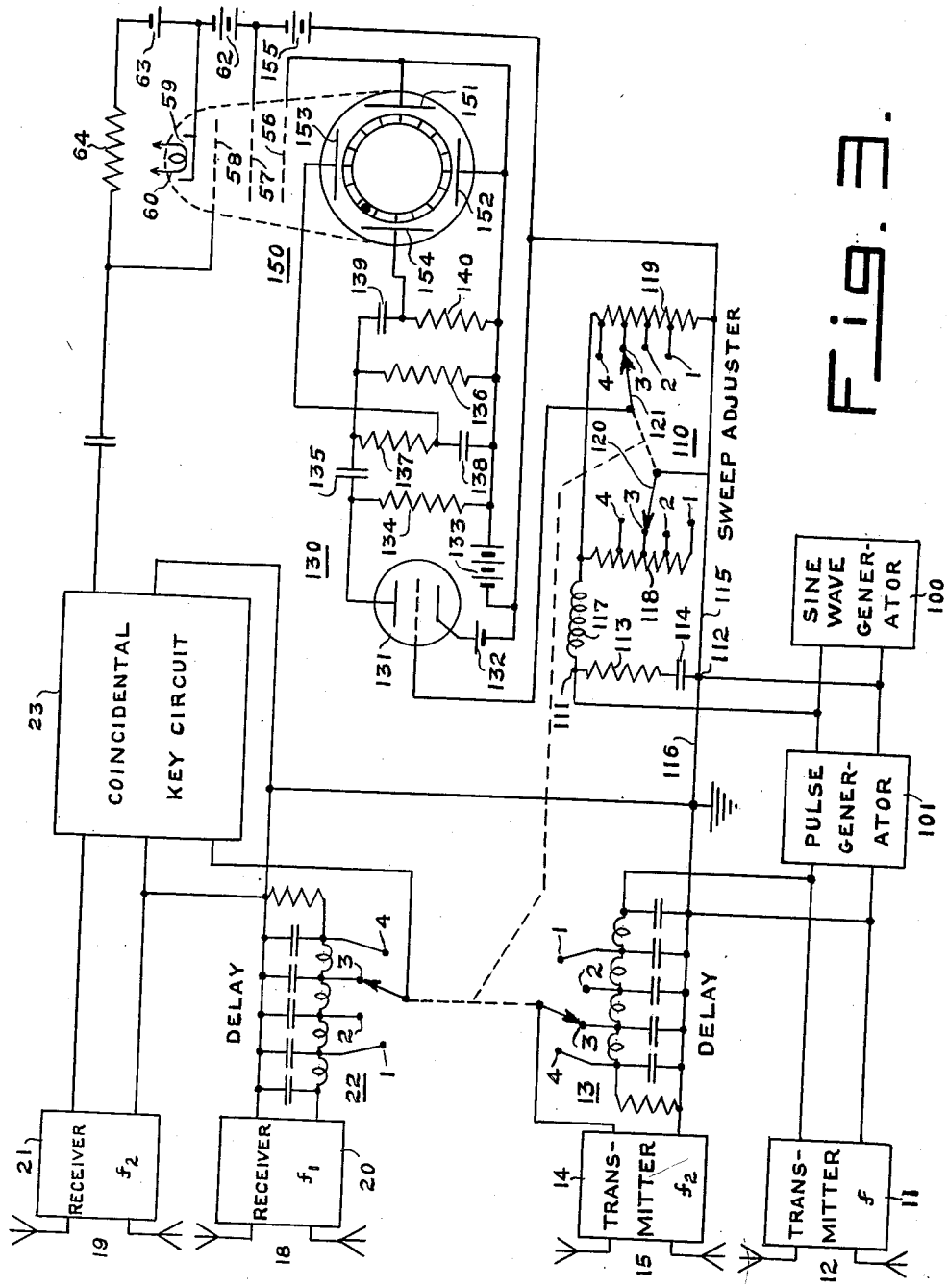

Patented Apr. 20, 1954

2,676,317

UNITED STATES PATENT OFFICE 2,676,317

PULSE ECHO RADAR SYSTEM EMPLOYING A DOUBLE CHANNEL

Ellison S. Purington, Gloucester, Mass., assignor, by mesne assignments, to Radio Corporation of America, New York, N. Y., a corporation of Delaware Application January 12, 1945, Serial No. 572,496

8 Claims. (Cl. 343—13)

This invention relates to a system for determining the distance from or height of an object and has for an object to provide a novel and improved system of the above type which is capable of working through interference.

Another object is to provide a system of the radar type which cannot be interfered with by the enemy even when the object being measured is itself equipped with radar.

In accordance with the present invention, the radar signals are propagated in the form of pulses on two different channels and with a predetermined pulse sequence. The receiver for the reflected waves responds only to received pulses of the predetermined sequence. The timing of the received pulses with respect to the transmitted pulses, which is a measure of the distance to the object, is determined by a standard indicator such as a cathode ray tube or oscilloscope. Means are provided for controlling at will the pulse sequence both of the transmitter and of the receiver so that in the case of interfering signals the pulse sequence may be changed to eliminate the interference. As the system is only responsive to the predetermined pulse sequence spurious indications are largely eliminated.

The invention will be better understood by referring to the following description, taken in connection with the accompanying drawings in which certain specific embodiments thereof have been set forth for purposes of illustration.

In the drawings,

Fig. 3 is a similar schematic diagram illustrating a further embodiment of the invention.

Figure 1:
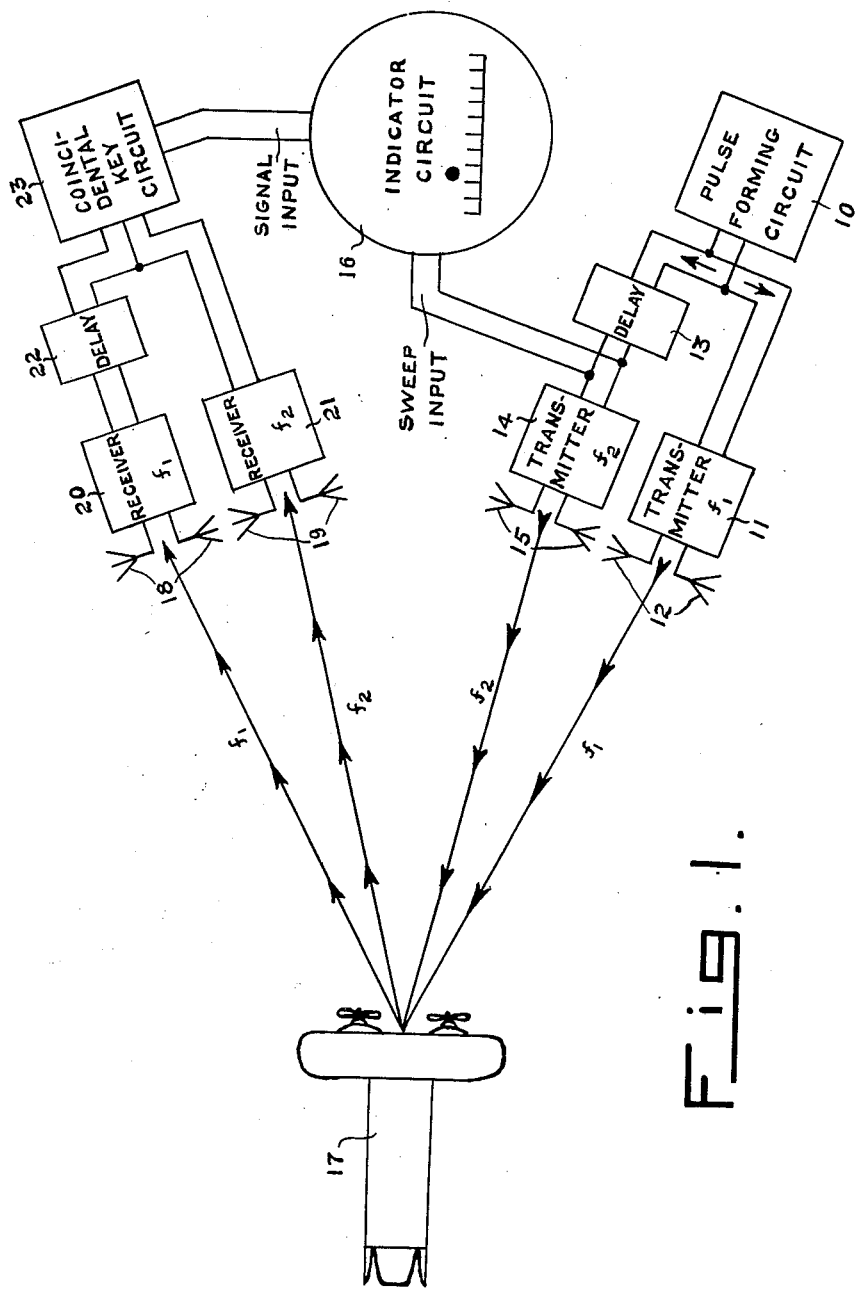
Fig. 1 is a schematic block diagram illustrating the present invention.

Referring to Fig. 1, the transmitter and receiver are of the general type disclosed in my co-pending application Ser. 537,799, now Patent No. 2,449,819, issued September 21, 1948, filed May 29, 1944, for Radio Control System and embodies a pulse forming circuit 10 which is capable of forming a series of short pulses and is connected to modulate transmitters 11 and 14 operating respectively on frequencies $f_1$ and $f_2$ and provided with radiating antennas 12 and 15 respectively. A delay circuit 13 is connected between the pulse forming circuit 10 and the input to the transmitter 14 so as to introduce a predetermined delay in the pulse modulating the transmitter 14 so that the transmitters 11 and 14 are pulsed in sequence with a predetermined interval between pulses.

The radiant energy waves from the transmitters 11 and 14 after reflection from a distant object, indicated at 17, are received by receiving antennas 18 and 19 which are connected to receivers 20 and 21 respectively tuned to the frequencies $f_1$ and $f_2$ and selective of those frequencies. The pulses produced by the transmitters 11 and 14 are selected and made available in the respective output circuits of the receivers 20 and 21.

The receivers 20 and 21 are connected to a coincidental key circuit 23, a delay circuit 22 being interposed between the receiver 20 and the key circuit 23 and so adjusted that the delay introduced by the circuit 22 corresponds to that introduced by the circuit 13 of the transmitter and will cause the two pulses received to arrive at the coincidental key circuit 23 simultaneously.

The coincidental key circuit 23 is designed to respond only to the simultaneous reception of the two pulses and produces a signal which is supplied to the signal input circuit of an indicator 16 such as a cathode ray tube. The input to the transmitter 14 is connected to the sweep input circuit of the indicator 16 and is adapted to cooperate with the signal input circuit to produce an indication which represents the distance travelled by the reflected waves as is well known in the radar art.

In this system, no indication results from pulses on a single channel, as in the usual radar and altimeter devices. Operation results only from the conjoint operation of pulses on the different channels with a time delay between pulses which is preset by devices 13 and 22. If the object 17 is itself transmitting radar pulses, this will not be a source of disturbance. Even if the types of equipment are the same, interference can be avoided by simultaneous adjustment of the two delays 13 and 22 so as to make the system responsive to different time delay intervals on the two channels than is being used by the similar equipment on the object 17.

Figure 2:
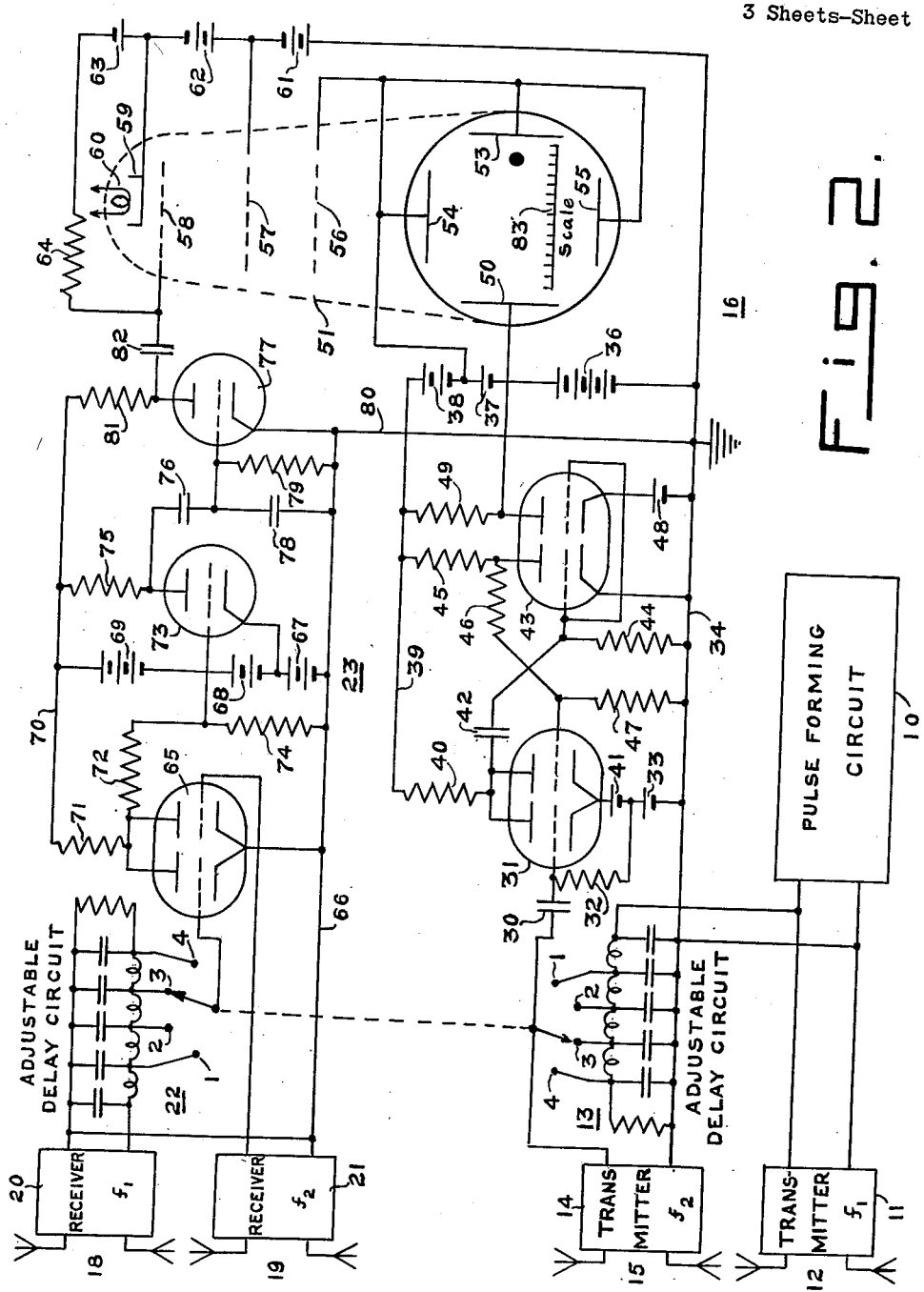
Fig. 2 is a schematic diagram of a transmitting and receiving circuit illustrating one embodiment of the invention.

In Fig. 2, elements which correspond to those of Fig. 1 are given similar reference numbers. The delay devices 13 and 22 of Fig. 2 are of the transmission line type, it being understood that several sections can be used between taps. The variation of time delay is accomplished by choice of the output tap of the delay device, and this may be made unicontrol if desired. The indicator is of the cathode ray tube type and includes a sweep circuit energized by pulses from the input of transmitter 14, and a grid control circuit energized from the coincidental key circuit.

The sweep circuit comprises input condenser 30 the output of which is connected to one grid of duo-triode tube 31, which in turn is connected through resistor 32 to the positive end of battery 33, the negative end of which is connected to ground line 34. This tube is powerized from batteries 36, 37, 38 connected in series, with the negative end of 36 connected to the ground line 34 and the positive end of 38 connected to plate supply line 39, from which the plates of both triodes of 31 are connected by resistor 40. The negative end of a battery 41 is connected to the junction of the resistor 32 and the battery 33, and the positive end of the battery 41 is connected to the cathodes of both the triodes of tube 31. The plates of tube 31 are connected through blocking condenser 42 to the two grids of a duo-triode tube 43, which in turn are connected to the ground line 34 through a resistor 44. The cathode of one of the triodes 43 is connected to ground, and its plate is connected through resistor 45 to plate supply line 39, and through resistor 46 to the second grid of 31, which in turn is connected through resistor 47 to ground line 34. The remaining cathode of tube 43 is connected to the positive end of battery 48, the negative end of which is connected to ground line 34, and the corresponding plate is connected through resistor 49 to the plate supply line 39, and also to a horizontal deflection plate 50 of an oscilloscope tube 51, the other deflection plates 53, 54, 55 of which are connected together and to the junction of batteries 37 and 38, and also to the oscilloscope accelerating anode 56. The oscilloscope is provided also with a focusing electrode 57, control grid 58, cathode 59, with heater 60. The positive side of battery 61 is connected to ground line 34, and the negative side is connected to the focusing electrode 57 and to the positive side of a battery 62, the negative side of which is connected to the cathode 59, and to the positive side of a battery 63, the negative side of which is connected through a resistor 64 to the control grid 58.

The coincidental key circuit 23 comprises a duo-triode tube 65, the cathodes of which are connected to a ground line 66. One grid of tube 65 is connected to the output of the delay device 22 and the other grid is connected to the output of the receiver device 21. A three section battery 67, 68, 69 is connected with the negative end to ground line 66, and positive end to plate supply line 70. The plates of tube 65 are connected together and through a resistor 71 to the plate supply line 70, also through resistor 72 to the grid of a triode tube 73 which in turn is connected through resistor 74 to ground line 66. The cathode of tube 73 is connected to the junction of batteries 67 and 68. The plate of tube 73 is connected through a resistor 75 to plate supply line 70 and is connected through a condenser 76 to the grid of a triode tube 77, which in turn is connected to the ground line through condenser 78 and resistor 79 in parallel. The cathode of tube 77 is connected to ground line 66, which in turn is connected by ground line 80 to ground line 34. The plate of tube 77 is connected through resistor 81 to plate supply line 70, and through a condenser 82 to the control grid 58 of the oscilloscope 51. The face of the oscilloscope is provided with a suitable scale 83 which may be calibrated in terms of the electrical path length from antenna 15 to antenna 19 by way of the reflecting object 17 not shown.

It will be understood that the filaments of the tubes are heated by devices not shown, that the delay devices 13 and 22 are similarly set, as at position 3, and that a reflecting object 17 is in position to render the system operative. In place of batteries shown for simplicity, suitable other sources of D. C. voltage may be used.

In the operation of the device, the pulse forming circuit 10 recurrently produces a positive pulse which amplitude modulates the transmitter 11, causing energy of a short duration to be radiated from antenna 12. This energy is propagated to distant object 17, is reflected back, received by antenna 18, selectively actuates receiver 20 which produces a negative pulse which enters the delay line 22 and is delayed by a time interval corresponding to three sections thereof, and is impressed upon one grid of tube 65.

The positive pulse produced by circuit 10 also actuates delay device 13 and is delayed by a time interval corresponding to three sections thereof. Part of the output pulse of amplitude modulated transmitter 14, causes radiation from antenna 15, propagation to object 17, reflection back to antenna 19, selective reception and detection by receiver 21, to cause a negative pulse impressed upon the other grid of tube 65. Since the total path delays from pulse forming circuit 10 to coincidental key tube 65 are equal, the pulses arrive at the two grids of 65 at the same time.

The remaining part of the positive pulse output of delay device 13 is impressed upon the actuating grid of tube 31. This tube is provided with sufficient positive cathode bias so that in the steady state condition with no pulse impressed, there is little or no current flowing to the plates through resistor 40, whereby the plates of the tube 31 are substantially at the potential of plate supply line 39. When the positive pulse is impressed through condenser 30 upon the grid of tube 31, the corresponding plate momentarily draws current, driving the potential of both ends of condenser 42 negative; and driving the grids of tube 43 negative. This cuts off plate current through resistor 45 and increases the current through resistors 46 and 47, and brings the grid of the second portion of tube 31 sufficiently high so that current continues to pass through resistor 40 after the controlling pulse through condenser 30 has passed. The triodes of tube 43 are so constructed and the battery 48 so chosen that while the pulse through 42 drives the grid of the first section far beyond cutoff, the plate resistor 49 of the other section passes current at all times. After the pulsing of tube 43, the condenser 42 discharges toward the equilibrium condition with ever diminishing current through resistor 44 and decreasing potential on the grids of the tube 43, and continuously changing current through resistor 49. This action continues until plate current passes through resistor 45 cutting off the second portion of tube 31, and rapidly bringing the grids of tube 43 to equilibrium condition, in which they remain until the system is again pulsed. Thus the current through 49 is changed at the pulse rate, with a useful portion of the cycle of operation at slow speed determined by the time constant or discharge operation of condenser 42 and associated networks. During this useful portion, the potential of oscilloscope plate 50 is diminishing in accordance with the increasing current through resistor 49. The batteries 37 and 38 are so chosen that at the start of the useful portion of the sweep, the plate 50 is positive with respect to plate 53, so that any oscilloscope electron stream is deflected toward plate 50. At the end of the useful portion of the sweep, this stream is deflected toward plate 53. The stream will exist only when the grid 58 is pulsed positively due to the reception of pulses from the object 17, and a scale may be provided calibrated so that the spot of light on the screen will indicate the distance of the object 17.

The coincidental key circuit 23 which controls the operation of the grid 58 to cause the spot of light to exist operates only when both grids of duo-triode tube 65 are negatively pulsed at the same time. The direct coupling from these triodes to triode 73 is so arranged that in the absence of pulses, no current passes through resistor 75. Moreover the bias of tube 73 is such that if one of the triodes of 65 is pulsed, no plate current of tube 75 results. With triodes of 65 for example of 10,000 ohms impedance at normal zero grid voltage, the circuits may be so adjusted that tube 73 passes current only when the impedance of the triodes of 65 in parallel exceeds a high predetermined amount, say 200,000 ohms, which can be accomplished only when both grids of tube 65 are simultaneously pulsed negatively.

The simultaneous application of negative pulses to both grids of tube 65 therefore produces a single negative pulse on the plate of triode 73, which is transferred through condenser 76 to the grid of the phase inverting amplifier triode 77. The condenser 78 and resistor 79 may be proportioned to give a pulse on the grid of tube 77 of somewhat longer duration than the pulses on grids of tube 65, so that the spot of the oscilloscope will be suitably illuminated for best operation. The negative pulse on the grid of tube 77 produces a positive pulse on the plate of tube 77, which is transferred through condenser 82 to pulse the control grid 58 of the oscilloscope in a positive sense to cause illumination of the oscilloscope screen at a scale point corresponding to the time delay of the system due to the external path.

In the modified form of Fig. 3, the principles of operation in general are the same as for Fig. 2 except that a circular sweep is used to give a somewhat longer calibrated scale for a given size oscilloscope than possible with a linear scale, and to provide other improvements in operation. Since a circular sweep is most easily developed from a sine wave generator, it is more practical to supply the oscilloscope sweep from a point in the system prior to the output of the transmitter delay circuit. Therefore the pulse forming circuit is here shown as comprising a sine wave generator 100 and a pulse generator 101, with take off from between the two to a sweep adjusting circuit 110, and a sweep generator 130 operatively connected to the oscilloscope 150. The remainder of Fig. 3 is similar to that of Fig. 2 except that the output of delay line 13 is used solely for operating the transmitter 14, and corresponding parts have been given similar reference characters. The elements 100 and 101 may be of the type disclosed in my copending application Ser. No. 536,104, now Patent No. 2,465,925, issued March 29, 1949, filed May 18, 1944, for Radio Control System.

The sweep adjuster is provided with input terminals 111 and 112 connected across the output of sine wave generator 100, with a resistor 113 and condenser 114 shunting the input. The terminal 112 is connected to a ground line 115 and by a ground line 116 to the ground of other parts of the system. Input terminal 111 is connected through inductor 117 and through tapped resistor 118 and tapped potentiometer 119 to ground line 115. These tapped resistors are provided with adjustable slides or contactors 120, 121, whereby the resistance of assembly 118 between inductor 117 and ground may be varied, and whereby a suitable portion of the voltage across resistor assembly 118 may be utilized. The taps on resistors 118 and 119 and the input elements 113, 114 are so chosen that the output of the sweep adjuster produces a phase delay corresponding to the time delays of devices 13, 22, at corresponding choices of taps, and so that the output voltage of the sweep adjuster 110 is independent of the phase delay setting. All the adjustments of the sweep adjuster and the delay devices 13 and 22 may be made unicontrol as indicated by the dotted lines. The sweep generator 130 comprises a triode tube 131, the control grid of which is connected to a tap 3 of resistor 119, and the cathode of which is grounded. The plate of tube 131 is connected through a resistor 134 to the positive end of a battery 133, the negative end of which is grounded. The plate of 131 is connected through a condenser 135 to a phase shifting network comprising three arms in parallel, the other ends of the arms being connected to the positive side of battery 133. One of these arms 136 serves to remove any possible D. C. potential from across the other arms which include condensers. A second arm comprises resistor 137 and condenser 138 in series, and a third arm comprises condenser 139 and resistor 140 in series. The numerical impedances of elements 137, 138, 139, 140 are all equal at the frequency of operation of the generator 100.

The horizontal and vertical deflection plates 151 and 152 of oscilloscope 150 are connected to the positive end of battery 133, the vertical deflection plate 153 is connected to the junction of resistor 137 and condenser 138, and the horizontal deflection plate 154 is connected to the junction of condenser 139 and resistor 140. The accelerating anode 56 of the oscilloscope is connected to the deflection plates 151 and 152, and the other electrodes are biased negatively with respect to ground by batteries 155, 62, 63.

In the operation of Fig. 3, the output of the sweep adjuster is phase delayed by the inductor and resistors 118 and 119 in parallel, with the amount of delay increasing as the value of the resistor arm decreases. Since the voltage across resistor 119 decreases with the resistance of the arm 118, the variable contact on resistor 119 is connected to increase correspondingly the proportion of the voltage across the resistor 119 which is fed to the sweep generator. In this manner the sweep generator is actuated at constant voltage, and with a time delay varying with control settings in accordance with the time delays of devices 13 and 22. By the condensers 138, 139 and resistors 137 and 140, which serve to delay and advance the voltages on plates 153 and 154 by 45 degrees with respect to the voltage across resistor 136, the electric deflection field of the oscilloscope is caused to be rotary so that if the grid 58 is sufficiently near cathode potential, a spot of light will appear on the screen with a circular sweep. A circular scale may be provided, calibrated substantially linearly with distance around the scale, so that the appearance of the spot of light at a specific point of the scale will indicate distance of the reflecting object 17, which is half the external path from the transmitter to the receiver antennas. This indication will be independent of the setting of the control which adjusts the time interval between pulses on the two channels which are required to operate the coincidental key circuit and cause the operation of the indicator.

In this manner, a system is provided in which the usual types of radar, and other sources of interference will not be capable of registering spurious indications, and with which similar systems may be prevented from interfering by choosing a different delay interval from that used by the interfering system.

While certain specific embodiments of the invention have been shown for purposes of illustration, it is to be understood that the invention is capable of various uses and that changes and adaptations may be made therein as will be readily apparent to a person skilled in the art. The invention is only to be limited in accordance with the scope of the following claims.

What is claimed is:

1. A distance measuring system comprising a pulse forming circuit producing a series of pulses, a pair of radiant energy transmitters connected to be modulated by said pulses to propagate radiant energy pulses over a pair of radio frequency channels, a delay circuit interposed between said pulse forming circuit and one of said transmitters to introduce a predetermined time interval between the pulses on the respective channels, a pair of receivers selective of the respective channels to receive said pulses after reflection from an object, a key circuit connected to the output of both receivers and responsive only to simultaneous pulses from both receivers, a delay circuit in the output circuit of the receiver responsive to the earlier pulse and suited to introduce a delay corresponding to that of said first delay circuit so that the pulses are made concurrent at the key circuit when received in the predetermined sequence, and indicator means actuated by the conjoint action of said transmitters and said key circuit to indicate the distance travelled by said pulses to said object.

2. A distance measuring system comprising a pulse forming circuit forming a series of pulses, a pair of radiant energy transmitters connected to be modulated by said pulses to propagate radiant energy pulses over a pair of radio frequency channels, a delay circuit interposed between said pulse forming circuit and one of said transmitters to introduce a predetermimend time interval between the pulses on the respective channels, a pair of receivers selective of the respective channels to receive said pulses after reflection from an object, a key circuit connected to the output of both receivers and responsive only to simultaneous pulses from both receivers, a delay circuit in the output circuit of the receiver responsive to the earlier pulse and suited to introduce a delay corresponding to that of said first delay circuit so that the pulses are made concurrent at the key circuit when received in the predetermined sequence, indicator means actuated by the conjoint action of said transmitters and said key circuit to indicate the distance travelled by said pulses to said object, and means effecting a like adjustment of both of said delay circuits for varying the pulse sequence.

3. A distance measuring system comprising a pulse forming circuit forming a series of pulses, a pair of radiant energy transmitters connected to be modulated by said pulses to propagate radiant energy pulses over a pair of radio frequency channels, a delay circuit interposed between said pulse forming circuit and one of said transmitters to introduce a predetermined time interval between the pulses on the respective channels, a pair of receivers selective of the respective channels to receive said pulses after reflection from an object, a key circuit connected to the output of both receivers and responsive only to simultaneous pulses from both receivers, a delay circuit in the output circuit of the receiver responsive to the earlier pulse and suited to introduce a delay corresponding to that of said first delay circuit so that the pulses are made concurrent at the key circuit when received in the predetermined sequence, and a cathode ray oscilloscope having a sweep circuit connected to respond to said transmitter and a signal circuit connected to be actuated by said key circuit to indicate the distance of travel of said pulses to said object.

4. A distance measuring system comprising a pulse forming circuit forming a series of pulses, a pair of radiant energy transmitters connected to be modulated by said pulses to propagate radiant energy pulses over a pair of radio frequency channels, a delay circuit interposed between said pulse forming circuit and one of said transmitters to introduce a predetermined time interval between the pulses on the respective channels, a pair of receivers selective of the respective channels to receive said pulses after reflection from an object, a key circuit connected to the output of both receivers and responsive only to simultaneous pulses from both receivers, a delay circuit in the output circuit of the receiver responsive to the earlier pulse and suited to introduce a delay corresponding to that of said first delay circuit so that the pulses are made concurrent at the key circuit when received in the predetermined sequence, a cathode ray oscilloscope having a sweep circuit connected to respond to said transmitter and a signal circuit connected to be actuated by said key circuit to indicate the distance of travel of said pulses to said object, and means effecting like adjustment of both of said delay circuits for varying the pulse sequence at will.

5. A distance measuring system according to claim 1 in which the key circuit comprises a pair of space discharge paths responsive to the respective receivers and output means responsive only to the simultaneous change of the space current in both of said paths.

6. A distance measuring system according to claim 3 in which the sweep circuit of the cathode ray oscillograph is pulsed in synchronism with the delayed pulse to cause a linear sweep of said ray.

7. A distance measuring circuit according to claim 3 in which the sweep circuit of said cathode ray oscillograph is responsive to a sine wave generator to produce a circular sweep of said ray and adjustable phasing means is provided to adjust the sweep in accordance with the delay introduced by the delay circuits.

8. A distance measuring system comprising transmitter means for transmitting periodically recurring radiant energy pulses over a first radio frequency channel and for transmitting other periodically recurring radiant energy pulses over a second radio frequency channel with said other pulses delayed a certain amount with respect to the first-mentioned pulses, the first-mentioned pulses and said other pulses recurring at the same repetition rate, receiver means for selectively receiving the pulses of the first channel after reflection from an object and for selectively receiving the pulses of the second channel after reflection from said object, delay means supplied with signal from said receiver means for delaying the reflected first-mentioned pulses by said certain amount, coincident means responsive only to the application thereto of two pulses which are coincident, means for supplying to said coincident means the received second-channel pulses and the received and delayed first-mentioned pulses, and indicator means to which the output signal of said coincident means is applied and which is actuated by the cojoint action of said transmitting means and said coincident means to indicate the distance travelled by said transmitted pulses to said object.

References Cited in the file of this patent

UNITED STATES PATENTS

| Number | Name | Date |
|---|---|---|
| 2,175,270 | Koch | Oct. 10, 1939 |
| 2,392,546 | Peterson | Jan. 8, 1946 |
| 2,405,238 | Seeley | Aug. 6, 1946 |
| 2,414,265 | Lawson | Jan. 14, 1947 |

FOREIGN PATENTS

| Number | Country | Date |
|---|---|---|
| 111,594 | Australia | Mar. 19, 1939 |